United States Patent
Maisuria et al.

(10) Patent No.: US 10,394,304 B2
(45) Date of Patent: Aug. 27, 2019

(54) OPTIMIZED POWER TRANSITIONS BASED ON USER OR PLATFORM CONDITIONS

(71) Applicant: Microsoft Technology Licensing, LLC, Redmond, WA (US)

(72) Inventors: Paresh Maisuria, Redmond, WA (US); James Anthony Schwartz, Jr., Seattle, WA (US); M. Nashaat Soliman, Redmond, WA (US); Matthew Holle, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 221 days.

(21) Appl. No.: 15/372,236

(22) Filed: Dec. 7, 2016

(65) Prior Publication Data

US 2018/0157305 A1    Jun. 7, 2018

(51) Int. Cl.
  *G06F 1/32*     (2019.01)
  *G06F 9/44*     (2018.01)
  *G06F 1/3231*   (2019.01)
  *G06F 1/3287*   (2019.01)
  *G06F 9/4401*   (2018.01)

(52) U.S. Cl.
  CPC .......... *G06F 1/3231* (2013.01); *G06F 1/3287* (2013.01); *G06F 9/4418* (2013.01); *Y02D 10/44* (2018.01)

(58) Field of Classification Search
  CPC ..... G06F 1/3231; G06F 1/3287; G06F 9/4418
  See application file for complete search history.

(56) References Cited

U.S. PATENT DOCUMENTS

| | | |
|---|---|---|
| 7,100,037 B2 | 8/2006 | Cooper |
| 7,107,444 B2 | 9/2006 | Fortin et al. |
| 7,689,850 B2 | 3/2010 | Cantwell et al. |
| 7,971,081 B2 | 6/2011 | Cooper et al. |
| 8,082,433 B1 | 12/2011 | Fallone et al. |
| 8,386,823 B2 | 2/2013 | Kumar et al. |
| 8,560,872 B2 | 10/2013 | Gupta |
| 8,775,768 B2 * | 7/2014 | Yamashita ............ G06F 9/4418 707/812 |
| 8,914,658 B2 | 12/2014 | Chakra et al. |
| 8,984,316 B2 | 3/2015 | Forristal et al. |
| 9,032,194 B2 | 5/2015 | Iyigun et al. |

(Continued)

OTHER PUBLICATIONS

"International Search Report and Written opinion Issued in PCT Application No. PCT /US2017/064105", dated Mar. 20, 2018, 14 Pages.

(Continued)

*Primary Examiner* — Fahmida Rahman
(74) *Attorney, Agent, or Firm* — Liang IP, PLLC

(57) ABSTRACT

Hibernating a computing system. The method includes detecting at least one condition which indicates the availability of time to perform hibernation optimization steps on the computing system. The hibernation optimization steps optimize resume time from hibernate. The method further includes detecting a trigger indicating that the computing system is to be put into a hibernate state. As a result of detecting the at least one condition and the trigger, the method further includes performing hibernation steps to hibernate the computing system in a way that optimizes resume time from hibernate of the computing system.

20 Claims, 6 Drawing Sheets

(56) References Cited

U.S. PATENT DOCUMENTS

| | | | |
|---|---|---|---|
| 9,063,728 B2 | 6/2015 | Wakrat et al. | |
| 9,213,401 B2 | 12/2015 | Sakarda | |
| 2007/0074053 A1 | 3/2007 | Bulusu et al. | |
| 2007/0234028 A1 | 10/2007 | Rothman et al. | |
| 2007/0250730 A1 | 10/2007 | Reece et al. | |
| 2007/0288687 A1* | 12/2007 | Panabaker | G06F 13/1615 711/103 |
| 2008/0168930 A1* | 7/2008 | Calero | A47B 21/0314 108/50.02 |
| 2009/0157960 A1* | 6/2009 | Koga | G06F 11/3485 711/115 |
| 2011/0087901 A1* | 4/2011 | Lo | G06F 1/26 713/300 |
| 2012/0166840 A1* | 6/2012 | Rothman | G06F 9/4418 713/323 |
| 2012/0324251 A1 | 12/2012 | Bolanowski et al. | |
| 2015/0067241 A1* | 3/2015 | Atkinson | G06F 1/3275 711/103 |
| 2017/0192794 A1* | 7/2017 | Lo | G06F 9/4401 |

OTHER PUBLICATIONS

"Ensuring Application Compatibility With System Sleep and Display Power Management", https://www.google.co.in/url?sa=t&rct=j&q=&esrc=s&source=web&cd=1&cad=rja&uact=8&ved=0ahUKEwis4v3Y6PfPAhWMvY8KHeTBCkcQFggdMAA&url=http%3A%2F%2Fdownload.microsoft.com%2Fdownload%2F3%2F0%2F2%2F3027d574-c433-412a-a8b6-5e0a75d5b237%2Fscience-sleep.docx&usg=AFQjCNHolhTv2J9V1mMdXVI7k0N1nloamQ&sig2=cX-UIN-, Jun. 16, 2010, 13 pages.

\* cited by examiner

OPTIMIZED POWER TRANSITIONS BASED ON USER OR PLATFORM CONDITIONS

BACKGROUND

Background and Relevant Art

As a means to save power, operating systems (OSs) may implement a hibernate sleep state, such as the ACPI-defined sleep state called S4 Hibernate, for a computing system. This hibernate state inventories memory of the system, stores it to non-volatile storage media, such as to disk in a hibernate file and turns power to the system off. Later, when power to the system is restored, the hibernate file on disk is detected and restored to memory so that no user-state is lost.

In addition to the hibernate file, some virtual memory contents may already be stored on non-volatile storage media, such as on disk as a result of being in paged into a virtual memory pagefile stored on disk during ordinary operations of the computing system. This data stored in virtual memory does not need to be stored in the hibernate file as it is already persisted in non-volatile media. Indeed, storing this data in the hibernate file would cause multiple inefficiencies in that it would require a longer time to hibernate the system due to the need to move the data from the pagefile to the hibernate file. Additionally, it would make the pagefile larger such that restoring from sleep would also be less efficient.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computer implemented method of hibernating a computing system. The method includes detecting at least one condition which indicates the availability of time to perform hibernation optimization steps on the computing system. The hibernation optimization steps optimize resume time from hibernate. The method further includes detecting a trigger indicating that the computing system is to be put into a hibernate state. As a result of detecting the at least one condition and the trigger, the method further includes performing hibernation steps to hibernate the computing system in a way that optimizes resume time from hibernate of the computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein implement mechanisms where hibernate behavior is adjusted at runtime based on user and/or platform conditions. The OS will assess user, platform, or other conditions and preferences and use this as input to decide how best to optimize the hibernate experience. In particular, a number of different hibernate strategies may be available. Based on various conditions, one of the strategies may be selected for hibernating the system.

In particular, new types of non-volatile storage media allow for very fast access of data. Using this new media, when restoring from hibernate, a sufficient amount of state is needed from the hibernate file to provide the user with only some basic parts of a user interface. For example, a basic user interface background, lock screen and/or mouse controlled pointer may be provided to the user. Additional user interface elements can be gradually restored from the pagefile in virtual memory either in some defined order and/or based on user interaction with the user interface so as to restore elements that appear to be desired by the user more quickly than other elements. If the media (i.e., the non-volatile storage media) storing the pagefile is sufficiently fast, elements can be restored on demand very quickly, and with little impact to the user. In particular, the hibernate file is restored in its entirety, and additional state can be paged in, on demand, from the pagefile.

In contrast, the larger the hibernate file, the longer it takes to provide the user with basic user interface elements at restore. Thus, on hibernate, data in the physical memory can be sent to a pagefile in virtual memory to reduce the amount of data that needs to be stored in the hibernate file. However, this causes the hibernate process to take longer. In particular, writing to the hibernate file can be optimized because it is a mirror of physical memory. Since the pagefile is dealing with virtual memory and multiple address spaces, writing to the pagefile takes additional coordination (flushing per process/address space). The consequence of this is that one is likely to get larger, more contiguous writes to the hibernate file.

Thus, attempting to reduce the size of the hibernate file, while benefiting the user when restoring, may adversely affect the user when hibernating. Thus, embodiments herein can determine if there is sufficient time to flush state from memory to the pagefile without adversely affecting the user.

Figure 1:
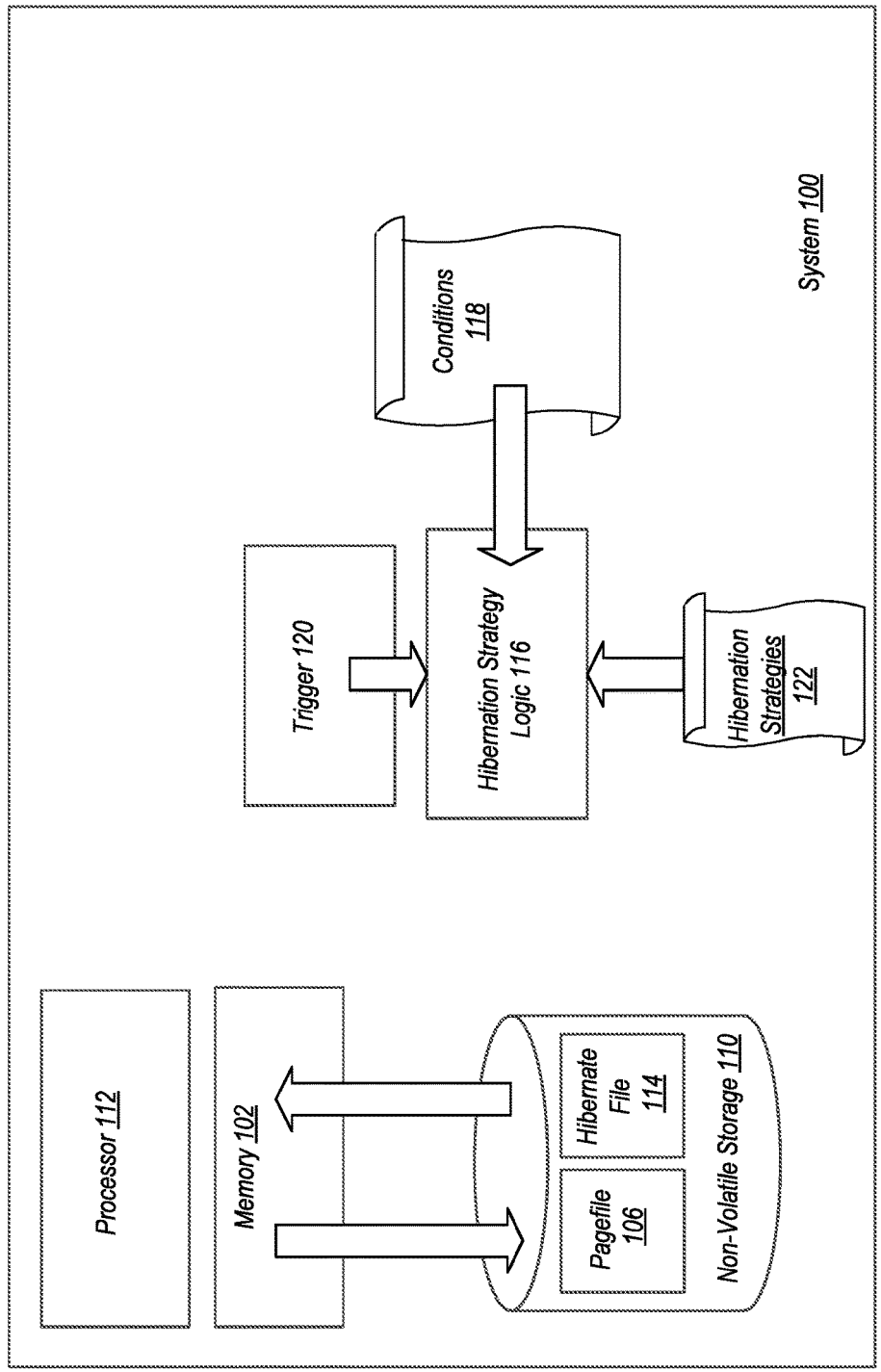
FIG. 1 illustrates a system configured to optimize hibernation strategies.

Reference is now made to FIG. 1, with illustrates a system 100. The system 100 includes system memory 102. The system memory 102 includes state for the system 100. Such state may include, for example, data values defining progression of execution of various executable entities, such as applications, drivers, operating system components, etc. The state may further include user state for at least one user of the system 100. User state may include information for a user, such as information about what applications, and state of applications a user is using on the system 100. User state may additionally or alternatively include authentication information for the user for various applications or services being used by the user. In general, user state is any state that can be identified as being directly associated with a particular user of the system 100.

Figure 2:
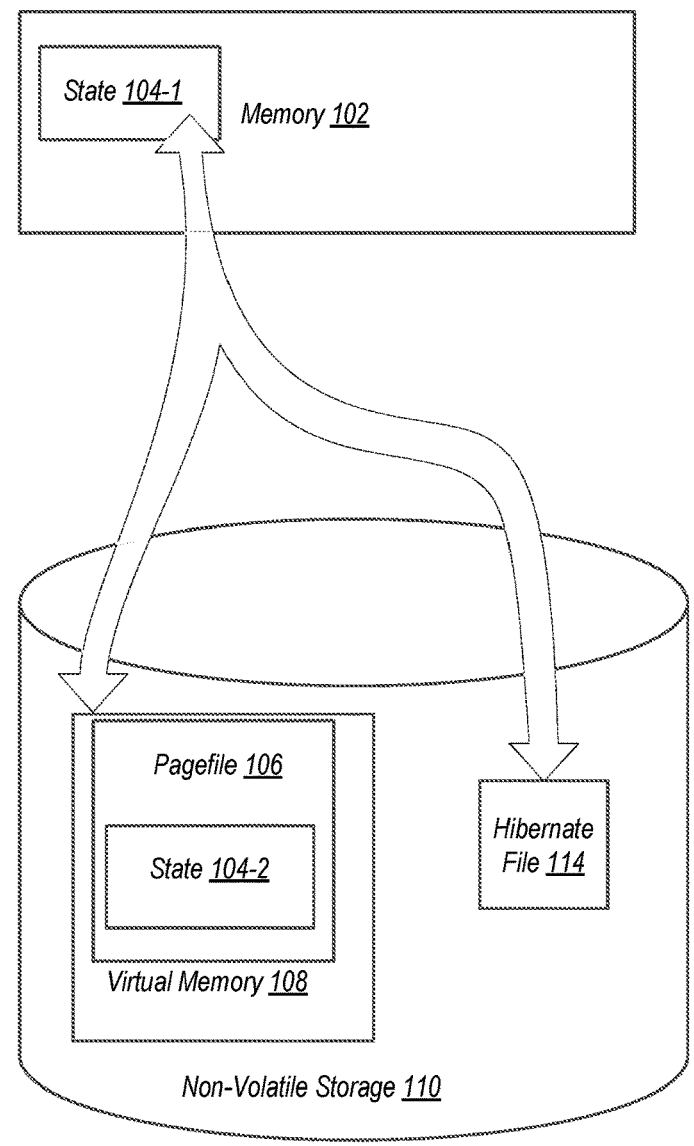
FIG. 2 illustrates additional details with respect to storing state to non-volatile storage.

Note that the state may be stored in a distributed fashion where different portions of the state are stored in different locations. For example, with reference to FIG. 2, FIG. 2 illustrates that state 104 stored in a distributed fashion, where a first portion 104-1 of the state 104 is stored in memory 102 and a second portion 104-2 of the state is stored in a pagefile 106 of virtual memory 108 on non-volatile storage 110 for the system 100. Note that various well-known virtual memory operations can be used to move portions of the state 104.

The non-volatile storage 110 of the system 100, may be for example, a hard-drive, solid state drive, or other storage that can persist data when power is removed from the non-volatile storage 110. As will be illustrated in detail below, some embodiments may include functionality for determining what type(s) of non-volatile storage are included in the system 100 and may use this information in determining how to hibernate the system 100. Although, in other embodiments, the non-volatile storage 110 may be known to be a particular type of storage having certain performance characteristics. In particular, it may be known that data can be accessed at or above some threshold speed. This allows for less user impact when a small hibernate file 114 that includes only sufficient information to provide a limited user interface and other state is gradually obtained from the pagefile 106. If the pagefile can be accessed with sufficient speed, then the user experience is more acceptable as additional user interface portions and applications can be loaded into memory 102 more quickly on resume.

When the system 100 hibernates, at least some portion of system state needs to be persisted. In particular, the state 104 may be stored in the non-volatile storage 110 such that when power is removed from major portions of the system, including from the memory 102, the processor 112, and non-volatile storage 110, the state 104 will persist, such that when the system 100 returns from hibernate, and power is reapplied to the memory 102, processor 112 and non-volatile storage 110, the state 104 can be accessed by the system 100 to return the system to the state that it was operating prior to hibernation.

To persist the state 104, the state 104 can be stored to the non-volatile storage 110. As noted, parts of the state, such as the portion 104-2, are already stored to the non-volatile storage 110. In the most basic example, the remaining parts of the state, that is, the portion 104-1 of the state 104 is stored to the hibernate file 114 such that all of the state 104 is stored to non-volatile storage 110.

However, it should be noted that other strategies for storing the state may be implemented. For example, parts of the portion 104-1 could be flushed to virtual memory 108, to the portion 104-2, which will reduce the size of the portion 104-1 stored in the hibernate file 114. Indeed, in some embodiments, part of the portion 104-2 may actually be read into memory 102, into the portion 104-1 of state and then stored to the hibernate file 114 as part of the hibernation process. Thus, various strategies may be implemented for determining what portions of the state 104 are stored in the pagefile 106 and what portions of the state 104 are stored in the hibernate file 114.

As part of the hibernation process, embodiments illustrated herein are able to analyze various conditions and use this analysis to select and/or refine hibernation strategies selected to put the system into a hibernate state. For example, FIG. 1 illustrates hibernation strategy logic 116. The hibernation strategy logic 116 may receive as inputs various conditions 118. Such conditions 118 may include user presence information, non-volatile storage type information, non-volatile storage size information, system type information, system connection information, system peripheral information, system triggers received for triggering putting the system 100 into hibernate, etc. Note that the non-volatile storage type information may be used to infer I/O access speed and/or relative cost of random I/O reads to contiguous reads. Alternatively or additionally, I/O access speed and/or relative cost of random I/O reads to contiguous reads may be provided in metadata to the hibernation strategy logic 116. Alternatively or additionally, in some embodiments, I/O access speeds, and in particular, write speeds, can be measured for use in determining hibernate strategies.

There are additional characteristics that can factor into the decision of flushing to the pagefile or not. For example, the cost of random I/Os to contiguous I/Os including such factors as the disk rotation with seek cost may be considered. It is significantly more costly to flush to page file than hiberfile on a rotational disk compared to a SSD. Another characteristic may be when different storage types are available for pagefile versus hibernate file 114. If the pagefile (or pagefiles if there are more than one) and the hibernate file 114 are on different storage devices, they have different characteristics which cause one to be more costly than the other.

The hibernation strategy logic 116 may also receive a trigger 120. This trigger 120 indicates that the system 100 should be put into hibernate. For example, this may include a lid closing on a laptop device, a hibernate button press, a given amount of time elapsing, a determination that a user is not present (and potentially that the use has not been present for a particular amount of time) etc. Thus, embodiments may use inputs such as how the power transition to hibernate is initiated.

The hibernation strategy logic 116 can evaluate the conditions when the trigger 120 is received to determine a hibernation strategy for putting the system into hibernate. In particular, conditions may be used to determine which parts of the state 104 should be persisted to the pagefile 106 and which parts of the state 104 should be persisted to the hibernate file 114.

For example, in general, if there is a need to hibernate quickly, the portion 104-1 of state 104 in memory 102 will be written to the hibernate file 114 without much if any attempt to change that portion 104-1. For example, a lid closing may indicate that a user is about to physically move the system 100. Thus, there may be an advantage to performing hibernation steps quickly to avoid disk accesses while the system 100 is making somewhat violent movements which might cause severe hard disk errors to the non-volatile storage 110 if writes are being performed during the movement. In contrast, if the hibernation steps are being performed in response to a timeout trigger, it may be assumed that the system 100 is unlikely to be used for some period of time, and therefore the hibernation process may be extended. In particular, various actions could be performed to make resume from hibernate occur more quickly, when it occurs. Various examples will be illustrated below. Note that the examples below illustrate how a hibernation strategy may be selected based on a single condition (or some low number of conditions) it should be appreciated that other embodiments may combine various conditions to perform a calculus and make engineering trade-offs when selecting and/or tuning a hibernation strategy.

Note that hibernation strategies may be implemented in several fashions. For example, in some embodiments, a hibernation strategy may be selected from a closed set of hibernation strategies, such as the set of hibernation strategies 122. In particular, conditions 118 can be evaluated and based on a score or other logical determination, a hibernation strategy may be selected from the hibernation strategies 122. Such hibernation strategies may include, for example:
 store all state in memory 102 to the hibernate file;
 flush portions of the state in memory 102 to the pagefile 106;
 flush all portions of the state in memory 102 to the pagefile 106, except those portions needed to provide a basic user interface, which are stored to the hibernate file 114.

Other embodiments may include functionality for tuning hibernation strategies. For example, embodiments may attempt to reduce the amount of state stored to the hibernate file 114 by a certain percentage or storage amount. Some embodiments may attempt to define a custom strategy to have a specific amount of state data written to the hibernate file 114. Some embodiments may identify an amount of time that hibernate steps may be performed and implement or select steps that allow a hibernation strategy to be performed within the amount of time. For example, embodiments may estimate an amount of time that will elapse before the system is physically moved, an amount of time a user is expected to be absent from the system 100, an amount of time a user can tolerate waiting for hibernation to occur, etc. This estimated time may be used to automatically select hibernation steps that will be able to be performed within this estimated time.

The following now illustrates various hibernation strategies that may be performed:

In one example, embodiments may detect available storage in the non-volatile storage 110, and if necessary, reduce the size of the hibernate file 114 on disk by compressing state data or aggressively flushing state data to virtual memory 108 (and specifically into the pagefile 106) and/or discarding non-critical memory before hibernating.

Additionally or alternatively, the size of the hibernate file 114 may be optimized (either reduced or increased) based on I/O speeds and capabilities of the backing storage hierarchy. For example, if the non-volatile storage 110 is sufficiently fast, and there is sufficient time to flush large portions of the state data from memory 102 to the pagefile 106, then embodiments will reduce the amount of state data to be stored in the hibernate file 114 by flushing data to the pagefile 106. For example, the same amount of data needs to be written to disk, whether it is the hibernate file 114 or the pagefile 106. The I/O patterns between the two files differ and how the non-volatile storage 110 handles those differences can be used in determining which strategy to impose.

A difference between the two strategies is that writing to the pagefile 106 can lead to more random (i.e., smaller and/or non-contiguous I/Os). Fast storage which does not penalize disk seeks can result in near identical time writing to the pagefile 106 as to the hibernate file 114. For the reasons previously discussed, it may advantageous to bias towards writing to the pagefile 106 if the cost is the same or within some predetermined margin.

Some embodiments may determine to take additional time when hibernating to optimize for the resume experience. For example, embodiments may determine that the user is not present, and therefore will not be impacted by a hibernate process that takes longer than a hibernate process that does not optimize for the resume experience, or that performs fewer optimizations for the resume experience. Thus, embodiments may be able to take additional time to create a hibernate file 114 that is of a size, and includes state data that makes the resume experience very efficient when the system resumes from hibernate.

In particular, in an example where no user is present, the OS could take additional time and do more work as part of the transition to hibernate, thus improving the speed of the resume experience. The OS could perform actions such as flushing more pageable memory from the memory 102 to the backing pagefile 106, thus reducing the size of the hibernate file 114 (and thus reducing the time required for reading that smaller hibernate file on the resume path). Flushing pageable memory takes more time that writing the equivalent data to the hibernate file 114. However, with no user present, this does not constrain this process.

User presence triggers may include various factors. For example, some embodiments may use sensors on the system 100 to determine if the user is present. Such sensors may include peripheral devices such as a mouse, keyboard, touchscreen, or other user input devices. A user not interacting with these devices for some period of time may be an indicator that a user is not present.

Additionally or alternatively, embodiments may use one or more of a camera, infrared sensor, microphone and/or other sensor to attempt to physically identify a user in proximity to the system 100. Indeed, in some embodiments, facial recognition software may be used to determine if an authorized user is present at the system 100. Thus, even though the system 100 may be able to detect an individual near the system 100, the system 100 can further determine that the individual is not an authorized user of the system 100, and may therefore still select a hibernation strategy consistent with the user not being present at the system. Typically, such hibernation strategies have the ability to optimize storage of state 104 between the hibernate file 114 and the pagefile 106 in a way that allows for resuming quickly from hibernate.

Alternatively or additionally, some embodiments may be able to detect user presence by using user data about the user. Such user data may include scheduling data, communication data between the user and other users, location data of the user (such as by the user carrying a device that can be located, the user checking in at some location, etc.). For example, such data may include data in calendar entries, emails, or other user data. For example, a calendar entry may indicate that the user is to be in a particular location or that a user has a particular appointment that would make the user being present at the system unlikely. For example, the user may have a calendar entry for a dentist appointment at a particular time. Using this information, the system 100 could determine that the user is unlikely to be present at the system 100. Therefore, the system could determine that sufficient time is available to optimize a hibernate for quick resume. In some embodiments, this user data could be obtained from data stored on the system 100 itself. Alternatively or additionally, this data may be obtained from a service or other system remote from the system 100 through connection from the system 100 to other services and/or system.

In yet another example, the system 100 may be connected through network or other connections to other systems directly used by the user. Embodiments could detect that the user is present at one of the other systems, and that therefore, the user is unlikely to be present at the system 100. This could be used to determine that sufficient time is available such that hibernate steps could be optimized for quick resume from hibernate.

In another example, if there is a determination of an amount of time that constrains the hibernation process, embodiments may select a particular amount of pageable memory from the memory 102 that can be reliably flushed to the pagefile 106 within the determined amount of time. This determination may be made based on passed flushing processes, a determination of other operations the system 100 is presently performing, and/or other relevant factors. In some embodiments, the determined time may be determined using machine learning techniques or other techniques to fine-tune the amount of state data that can be reliably flushed to the pagefile 106 in the determined amount of time.

If the user is manually initiating the transition to hibernate, such as by pressing a button or closing a system lid, embodiments may opt for a speedy hibernation, by performing fewer operations on state data in memory than when optimizing for a quicker resume experience, based on the assumption that the user is present and waiting for completion of the hibernation process. For example, if the user has actively requested the system 100 go to hibernate (e.g. via a button-press or a lid closing), then there may be a requirement to quickly transition to hibernate. In this case, embodiments could immediately inventory all of the memory 102 that is in use and begin writing it to the hibernate file 114 on the non-volatile storage 110. This simpler mechanism has been shown to be faster. Of course, the resume path will be impacted because the larger hibernate file 114 will require more time to be read from the non-volatile storage 110 and processed.

Some embodiments may initiate transitioning to hibernate by a user simply moving out of the presence of the system 100. For example, the system 100 could detect, for example, by using a camera on the system 100, user data, or other information, that the user is moving physically away from the system 100 and that the user is unlikely to return for some period of time. This could trigger the system 100 being put into hibernate. And in particular, the hibernation process may be one that optimizes for a quick resume from hibernate.

In the case of the storage subsystem, if the read/write performance is deemed fast enough, and there is sufficient time, then all standby memory pages will be discarded and pageable memory will be written to the pagefile 106 before any remaining active memory is inventoried and stored to disk in the hibernate file 114. These additional steps can require multiple seconds before the system is hibernated. However the resume path is now made faster because the smaller hibernate file can be read more quickly and thus OS operation can begin earlier during a resume from hibernate path. Of course code and data must be paged in from the pagefile 106 as the system resumes, however since the storage subsystem has been pre-determined to be high speed, there is not a noticeable negative impact on the user experience that may otherwise have be observed on a system with a slower traditional harddisk or even a slower solid state drive.

The polarity of the above example can be reversed in cases where there is a need to perform a quick hibernate, for example when a user is present or when the system 100 uses mechanical hard disk drives that are subject to corruption if writing occurs conjunction with other intense movement. Here, there is risk the user could physically perturb the system 100 (e.g., by throwing the system in a backpack) soon after the transition was initiated with a button press or lid-close. In scenarios like this, the OS can immediately begin inventorying and writing to the hibernate file 114 all of the memory 102 that is currently in use, thus saving valuable seconds on the transition to hibernate.

In some embodiments, the OS will employ a set of logical checks to determine system characteristics, and in particular characteristics of the non-volatile storage 110. In particular, embodiments may attempt to identify characteristics that would indicate that the non-volatile storage is at or above a particular read speed. In particular, if the read speed is not above some threshold, then optimizations that reduce the size of the hibernate file 114 by flushing portions of state in memory 102 will not improve system performance on resume, and in many cases when using slower non-volatile storage, resume operations using a small hibernate file 114 that only includes sufficient data to instantiate a basic user interface (e.g., pointer and lockscreen) while needing to access the pagefile 106 to obtain other elements, may be deleterious to the user experience on resume from hibernate.

Note that some embodiments may further include logic to determine hibernation steps based on anticipated time for resume from hibernate. For example, if the system determines that a user may want to return quickly from hibernate, then optimizations could be done at hibernate (such as by, as illustrated above, minimizing the size of the hibernate file 114 while flushing other state data to the pagefile 106. However, if the system 100 can determine that additional time is available for resuming from hibernate, embodiments may forgo optimizing on hibernate. For example, the system could determine, based on a time of day that hibernate is initiated, that the next resume will have additional time for resuming from hibernate. Alternatively, based on the time of day that a hibernate is initiated that a quicker resume is desirable, and could therefore optimize the hibernate steps to optimize for a quicker resume.

Figure 3:
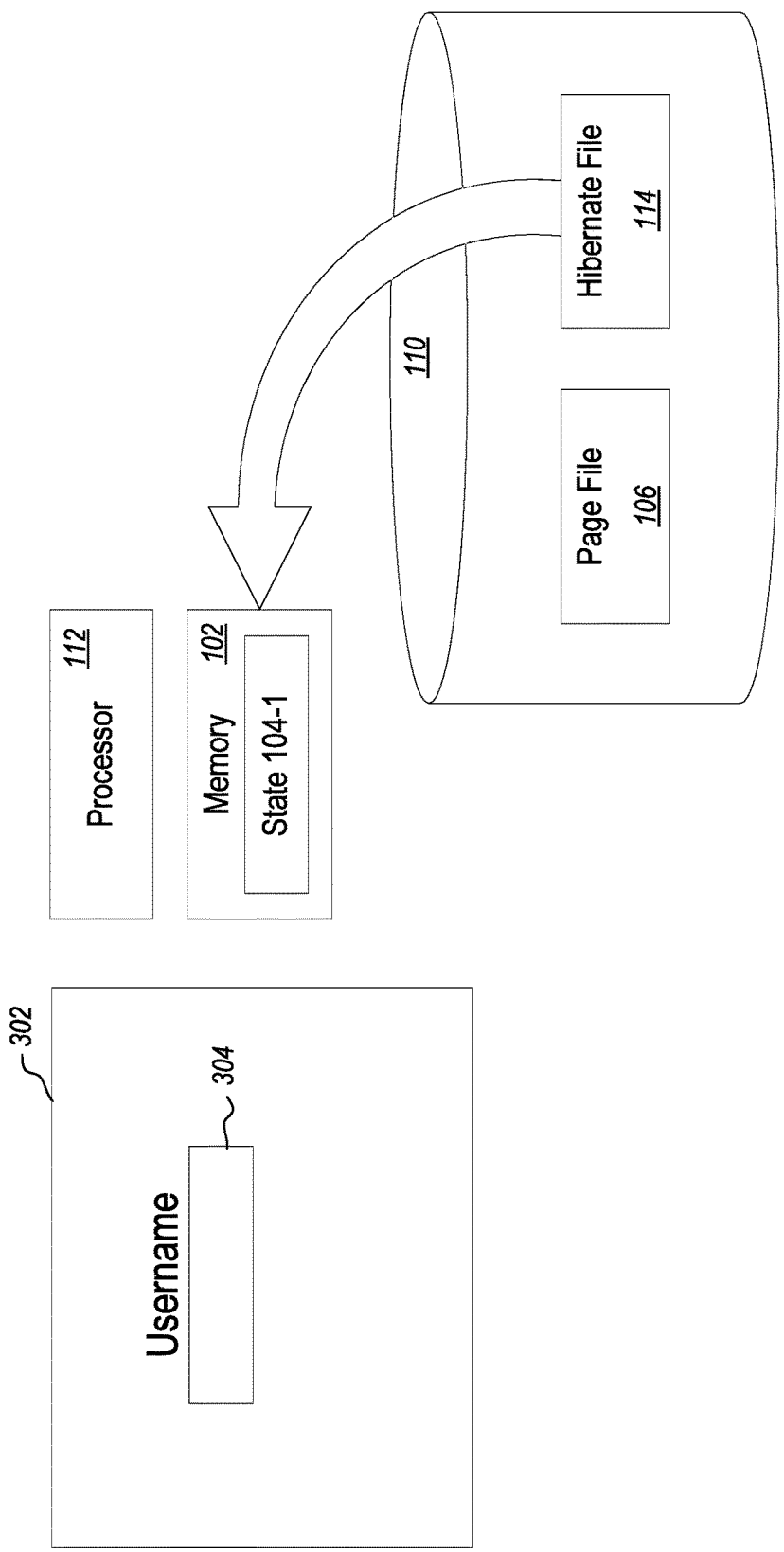
FIG. 3 illustrates a user interface and various details with respect to restoring from hibernate.

Referring now to FIG. 3, details with respect to restoring from hibernate are illustrated. FIG. 3 illustrates a user interface 302 which includes a lockscreen with a text box 304 in which a user can enter credentials. When restoring from hibernate where an optimized hibernate has been performed, the hibernate file 114 may only contain sufficient information for a basic user interface, which is loaded into system memory 102 and used by the processor to display the basic user interface shown in the user interface 302.

For example, the hibernate file 114 may only contain sufficient state data to implement a basic user interface while excluding data needed to implement other applications or data in applications that was available and in active use by the user when, or just prior to when, the hibernate occurred. In some embodiments, a basic user interface includes only a background screen, a mouse pointer and authentication interfaces that allow a user to authenticate to the system 100. In other embodiments, a basic user interface includes only a background and a mouse pointer. In still other embodiments, a basic user interface may include a background, mouse pointer, and user interface elements, such as icons, allowing a user to select applications.

Figure 4:
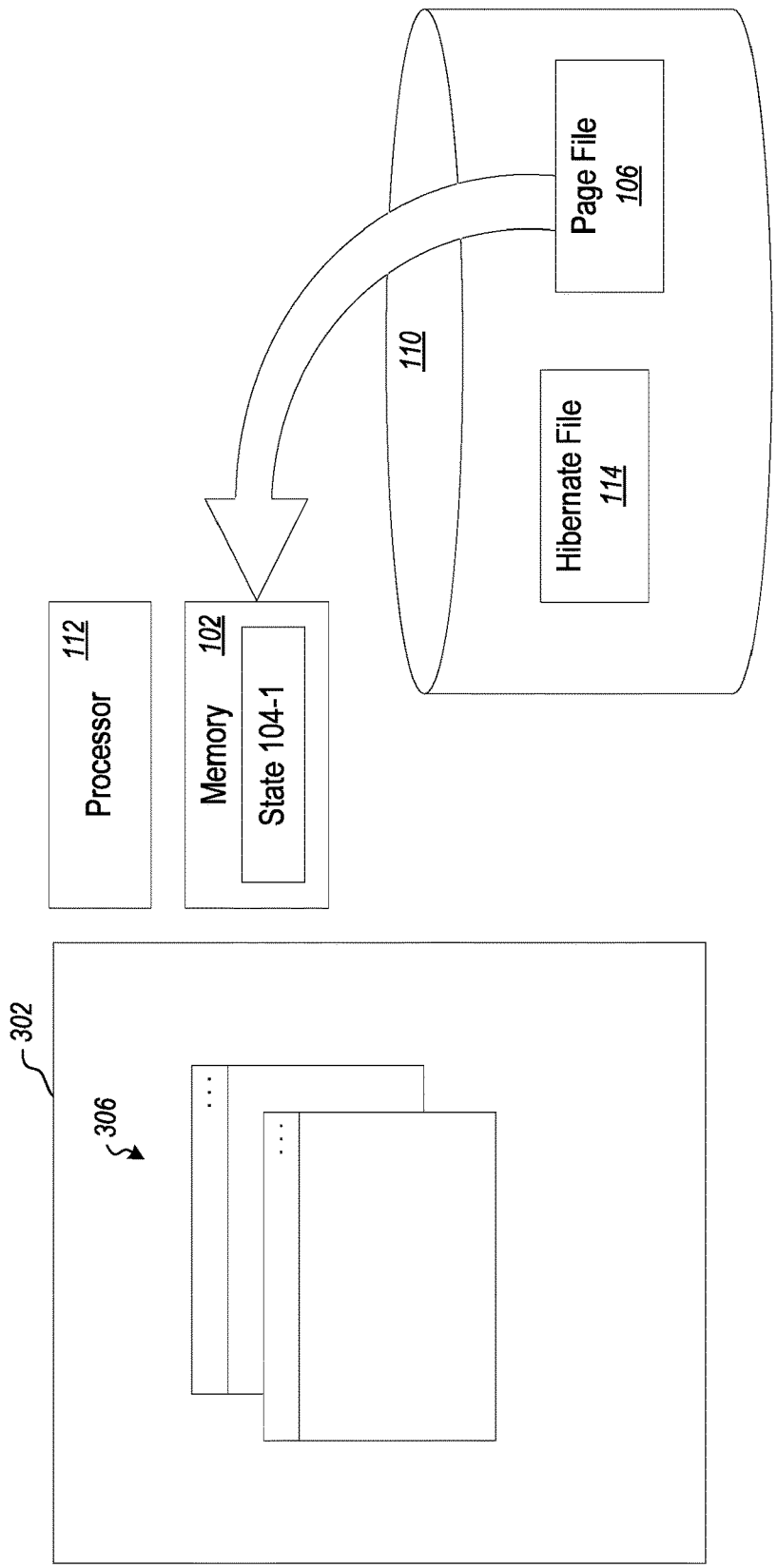
FIG. 4 illustrates the user interface and additional details with respect to restoring from hibernate.

However selecting the icons will require the system 100 to obtain the state data needed to initiate the applications from the pagefile 106 as illustrated in FIG. 4, such that applications 306 are able to restored or instantiated. In particular, FIG. 4 illustrates that state data for applications 306 can be obtained from the pagefile 106 and loaded into the memory 102, where the processor can use the state data to implement the applications 306. In some embodiments, data is obtained from the pagefile 106 on demand. For example, a user making a selection in the user interface 302 will result in obtaining state data from the pagefile 106. Alternatively or additionally, if the system 100 is not busy with other tasks, state data can be loaded from the pagefile 106 into the memory 102. In some embodiments, this may be done predictively with the system predicting which state data will most likely be needed for the user.

Note that as noted above, if the non-volatile storage 110 is sufficiently fast in its reads, and not penalized for non-contiguous I/Os (which is more likely when reading from the pagefile 106 compared to the hibernate file 114, this can be done in a fashion that is nearly seamless for the user. Thus, embodiments may implement a more efficient system that is able to restore from hibernate in a much more seamless way, from the user perspective than previous systems.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
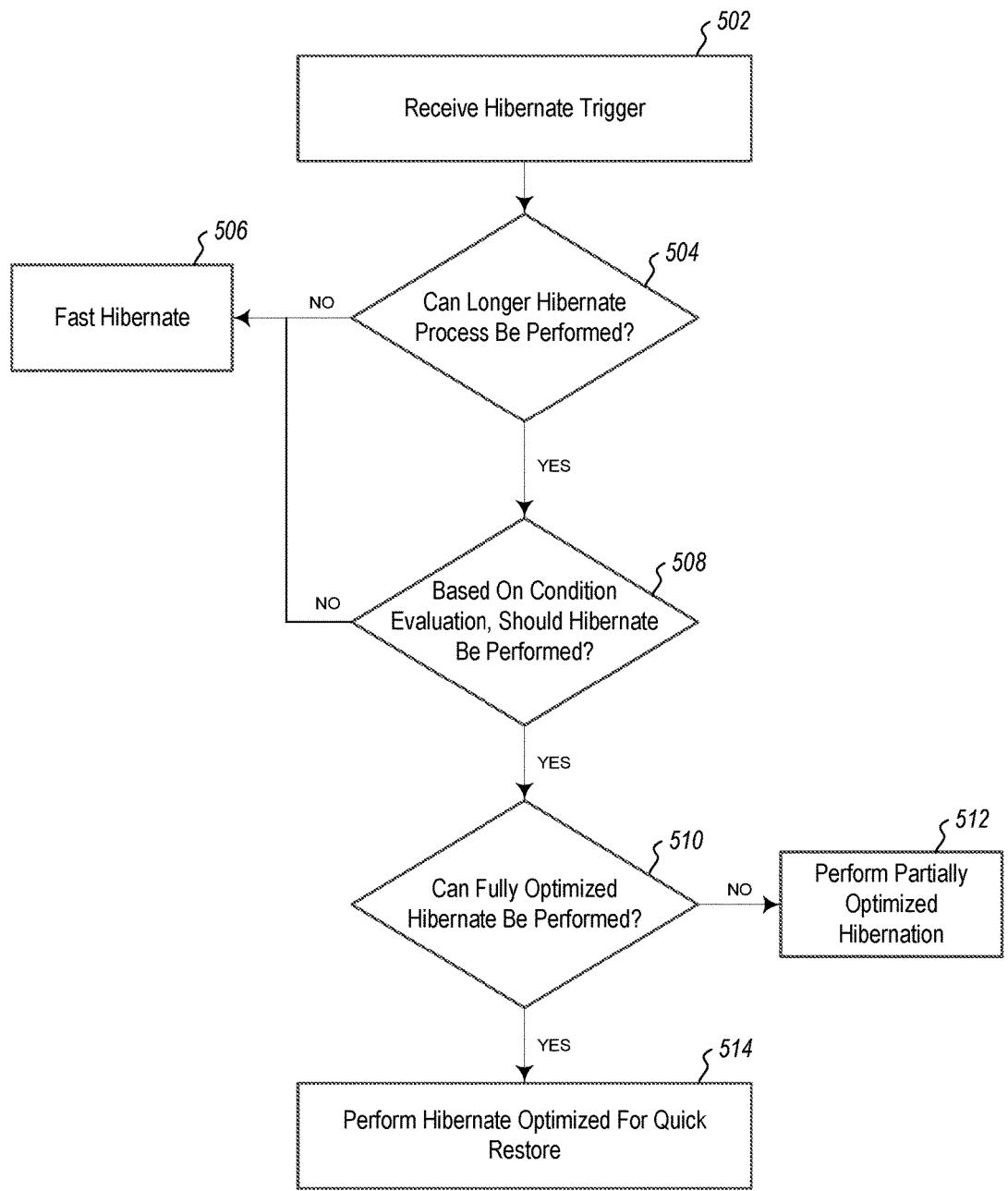
FIG. 5 illustrates a flow showing various actions that can be performed with respect to hibernation processes.

Referring now to FIG. 5, a flow 500 is illustrated showing how various actions may be performed. FIG. 5 illustrates an action of receiving a hibernate trigger (act 502). As illustrated above, this may include various manual triggers such as detecting a button press, detecting a lid on the system 100 closing, detecting a series of user interface interactions directing the system 100 to hibernate, etc. However, this may alternatively or additionally include various automatic triggers such as a timeout, recognizing a user moving away from the system 100 or other automatic triggers.

As illustrated at 504, this causes a determination to be made whether or not any longer hibernate processes can be performed. For example, in some embodiments, the system 100 may determine if there is sufficient time to optimize hibernate steps to create a small hibernate file 114 by trimming certain data in the memory 102 and flushing state from the memory 102 to the pagefile 106. For example, in some embodiments, this may be performed by determining that the user is not present at the system 100 or by determining that some time threshold can be met. Various ways of performing this detection are illustrated above. Additionally or alternatively, embodiments may determine that there is not sufficient time to perform a longer hibernate process. For example, the lid closing may indicate that the system 100 is about to be perturbed.

As illustrated at 506, if there is not sufficient time to perform a longer hibernate process, then a fast hibernate is performed. For example, embodiments may simply take all state in memory 102 and write the state to the hibernate file 114 without discarding any state in the memory 102 or writing any of the state to the pagefile 106.

If there is sufficient time to perform a longer hibernate process, as illustrated at 508, a determination is made on based on various condition evaluations if a longer hibernate should be performed. For example, there may be no need to perform a longer hibernate process if the restore from hibernate will occur in a fashion that does not affect the user. For example, if the user typically restores from hibernate and performs other activities while the system 100 is restoring from hibernate, then there may be no need to perform the longer hibernation process. If there is no need to perform the longer hibernation process, then a fast hibernate as illustrated at 506 can be performed.

If a determination is made that a longer hibernate process should be performed, then as illustrated at 510, embodiments can determine if there is sufficient time to perform a fully optimized hibernate. For example, there may not be sufficient time to perform a fully optimized hibernate due to potential for the system 100 to be perturbed, or some other factor that limits the amount of time in which hibernation steps can be performed. In this case, as illustrated at 512 embodiments may perform a partially optimized hibernate process where portions of the state in memory 102 are written two the pagefile 106, but in which other portions which would be read into the pagefile 106 of a fully optimized hibernate were able to be performed are not written to the pagefile 106, but rather are written to the hibernate file 114, along with state data needed to create a basic user interface such as that illustrated in FIG. 3.

As illustrated at 514, if a fully optimized hibernate can be performed, then the optimized hibernate is performed for quicker restore when a user restores from hibernate.

Figure 6:
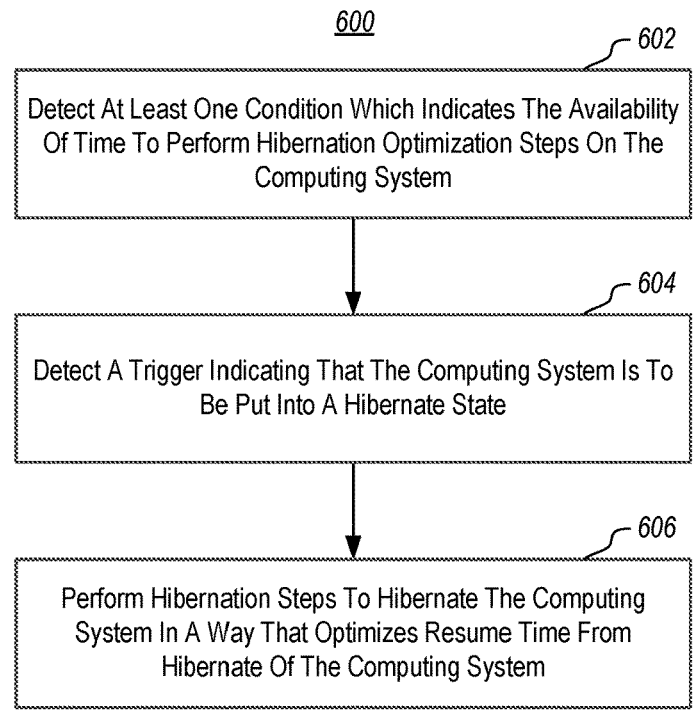
FIG. 6 illustrates a method of hibernating a computer system.

Referring now to FIG. 6, a method 600 is illustrated. The method 600 is a computer implemented method of hibernating a computing system. The method includes detecting at least one condition which indicates the availability of time to perform hibernation optimization steps on the computing system (act 602). In some embodiments, detecting a condition that indicates the availability of time may include determining that optimization may be done at minimal or no cost. For example, embodiments may determine that the time to optimize for resume is roughly the same cost as not optimizing. For example, as I/O speeds increase, and on devices without seek penalties, the cost may be negligible. The hibernation optimization steps optimize resume time from hibernate. For example, as illustrated above, a small hibernate file 114 may be created and state from memory 102 may be flushed to the pagefile 106. This may be particularly useful when the non-volatile storage 100 has sufficiently fast read times to make the restoration from hibernate faster when such steps are taken.

The method 600 further includes detecting a trigger indicating that the computing system is to be put into a hibernate state (act 604). This may include, for example, the manual triggers or automatic triggers described above.

As a result of detecting the at least one condition and the trigger, the method 600 further includes performing hibernation steps to hibernate the computing system in a way that optimizes resume time from hibernate of the computing system.

The method 600 may be performed where performing hibernation steps to hibernate the computing system in a way that optimizes resume time from hibernate of the computing system includes as part of the hibernate process, flushing state from memory at the computing system to a pagefile in virtual memory on non-volatile storage of the computing system, and storing only a sufficient amount of state in a hibernate file to implement a basic user interface on restore from hibernate.

The method 600 may be practiced where detecting the at least one condition comprises detecting that a user is not present at the computing system. For example, detecting that a user is not present at the computing system may include detecting using a camera at the computing system. Alternatively or additionally, detecting that a user is not present at the computing system may include detecting that user is using a different device. Alternatively or additionally, detecting that a user is not present at the computing system may include detecting that the user's calendar indicates that user has an appointment that prevents the user from being present at the computing system. Other modalities may be used, alternatively or additionally, such as interaction with peripheral devices, a certain time elapsing, or other conditions that indicate that the user is not present at the system.

The method 600 may be practiced where detecting a trigger indicating that the computing system is to be put into a hibernate state comprises determining that a user has moved away from the computing system. For example, the user may have a device that can be detected moving from the system, or the system may be able to detect, through a camera or infrared (IR) sensor that the user is moving away from the system 100.

The method 600 may further include detecting that the computing system comprises non-volatile storage media with read speeds meeting a predetermined threshold. In such embodiments, performing hibernation steps to hibernate the computing system in a way that optimizes resume time from hibernate of the computing system may be based on detecting that the computing system comprises non-volatile storage media with read speeds meeting a predetermined threshold. Detecting that the computing system comprises non-volatile storage media with read speeds meeting a predetermined threshold may include determining that the non-volatile media if of a type for which little or no penalty occurs for random non-contiguous I/O operations. In particular, this is the likely pattern for pagefiles as compared to hibernate files (which are typically more contiguous). If there is little no non-volatile media penalty for random writes, then it can be determined that sufficient time exists for performing optimizations.

The method 600 may further include detecting an amount of time for performing hibernation actions. In some such embodiments, performing hibernation steps to hibernate the computing system in a way that optimizes resume time from hibernate of the computing system is optimized to be performed within the detected amount of time.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
    a memory;
    one or more processors; and
    one or more non-volatile computer-readable media having stored thereon instructions that are executable by the one or more processors to configure the computing system to hibernate, including instructions that are executable to configure the computing system to:
        detect that the non-volatile computer-readable media have no penalty for disk seeks such that random non-contiguous I/O operations have the same relative cost as contiguous I/O operations, wherein the non-volatile computer-readable media comprises a page file and a hibernate file;
        detect a trigger indicating that the computing system is to be put into a hibernate state; and
        as a result of detecting that the computing system comprises non-volatile computer-readable media with no penalty for disk seeks and the trigger, perform hibernation to hibernate the computing system in a way that reduces a resume time of the computing system from hibernate from an anticipated resume time, wherein to reduce the resume time is performed by selecting a portion of memory content in the memory to be stored in the page file instead of the hibernate file.

2. The computing system of claim 1, wherein to perform hibernation comprises:
    during performing hibernation, flushing state information from the memory at the computing system to the page file in a virtual memory on the non-volatile computer-readable media of the computing system; and
    storing only a portion of the state information in the hibernate file to implement a user interface on restore from hibernate.

3. The computing system of claim 1, wherein the one or more non-volatile computer-readable media include additional instructions executable by the one or more processors to cause the computing system to detect that a user is not present at the computing system, and to perform hibernation in response to detecting that the user is not present at the computing system.

4. The computing system of claim 3, wherein to detect that the user is not present at the computing system comprises to detect that the user is not present at the computing system using a camera.

5. The computing system of claim 3, wherein to detect that the user is not present at the computing system comprises to detect that the user is using a different device than the computing system.

6. The computing system of claim 3, wherein to detect that the user is not present at the computing system comprises to detect that the user's calendar indicates that user has an appointment that prevents the user from being present at the computing system.

7. The computing system of claim 1, wherein to detect the trigger comprises to determine that a user has moved away from the computing system.

8. The computing system of claim 2, wherein the one or more non-volatile computer-readable media further have stored thereon instructions that are executable by the one or more processors to cause the computing system to:
    determine whether writing the page file can be performed within a predetermined threshold of writing the hibernate file; and
    wherein to perform hibernation includes to perform hibernation in response to determining that writing the page file can be performed within the predetermined threshold of writing the hibernate file.

9. The computing system of claim 1, wherein the one or more computer-readable media further have stored thereon instructions that are executable by the one or more processors to cause the computing system to:
    detect an amount of time for performing hibernation; and
    wherein to perform hibernation includes to perform hibernation within the detected amount of time.

10. A computer implemented method of hibernating a computing system, the method comprising:
    detecting that the computing system comprises one or more non-volatile storage media with no penalty for disk seeks such that random non-contiguous I/O operations have the same relative cost as contiguous I/O operations, wherein the non-volatile storage media comprises a page file and a hibernate file;
    detecting a trigger indicating that the computing system is to be put into a hibernate state; and
    in response to detecting that the computing system comprises the non-volatile storage media with no penalty for disk seeks and the trigger, performing hibernation to hibernate the computing system to reduce a resume time of the computing system from hibernate from an anticipated resume time, wherein to reduce the resume time is performed by selecting a portion of memory content in the memory to be stored in the page file instead of the hibernate file.

11. The method of claim 10, wherein performing hibernation comprises:
    during performing hibernation, flushing state information from the memory at the computing system to the page file in a virtual memory on the non-volatile storage media of the computing system; and
    storing only a portion of the state information in the hibernate file to implement a user interface on restore from hibernate.

12. The method of claim 10, further comprising detecting that a user is not present at the computing system, and wherein performing hibernation includes performing hibernation in response to detecting that the user is not present at the computing system.

13. The method of claim 12, wherein detecting that the user is not present at the computing system comprises detecting that the user is not present at the computing system using a camera.

14. The method of claim 12, wherein detecting that the user is not present at the computing system comprises detecting that the user is using a different device.

15. The method of claim 12, wherein detecting that the user is not present at the computing system comprises detecting that the user's calendar indicates that user has an appointment that prevents the user from being present at the computing system.

16. The method of claim 10, wherein detecting the trigger comprises determining that a user has moved away from the computing system.

17. The method of claim 10, further comprising:
  detecting that the one or more non-volatile storage media have read speeds meeting a predetermined threshold;
  wherein performing hibernation includes performing hibernation in response to detecting that the one or more non-volatile storage media have read speeds meeting the predetermined threshold.

18. The method of claim 10, further comprising:
  detecting an amount of time for performing hibernation; and
  wherein performing hibernation includes performing hibernation within the detected amount of time.

19. A computer implemented method of hibernating a computing system having a memory, one or more non-volatile storage media, and one or more processors operatively coupled to one another, the method comprising:
  detecting that the one or more non-volatile storage media have no penalty for disk seeks such that random non-contiguous input/output operations have same relative cost as contiguous I/O operations on the one or more non-volatile storage media, wherein the non-volatile storage media comprises a page file and a hibernate file;
  detecting a trigger indicating that the computing system is to be put into a hibernate state;
  in response to detecting that the one or more non-volatile storage media have no penalty for disk seeks and the trigger, performing hibernation operations to put the computing system in the hibernate state; and
  during performing the hibernation operations, selecting a portion of memory content in the memory to be stored in the page file instead of the hibernate file to reduce a resume time of the computing system from the hibernate state relative to an anticipated resume time.

20. The method of claim 19, further comprising:
  detecting that the one or more non-volatile storage media have read speeds meeting a predetermined threshold; and
  wherein performing the hibernation operations includes performing the hibernation operations in response to detecting that the one or more non-volatile storage media have read speeds meeting the predetermined threshold.

\* \* \* \* \*